United States Patent
Sakai et al.

(10) Patent No.: US 10,944,336 B2
(45) Date of Patent: Mar. 9, 2021

(54) POWER CONVERSION APPARATUS

(71) Applicant: Toshiba Mitsubishi-Electric Industrial Systems Corporation, Chuo-ku (JP)

(72) Inventors: Yuki Sakai, Tokyo (JP); Kazunori Matsumoto, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 16/747,911

(22) Filed: Jan. 21, 2020

(65) Prior Publication Data

US 2020/0161988 A1     May 21, 2020

Related U.S. Application Data

(63) Continuation of application No. PCT/JP2017/026514, filed on Jul. 21, 2017.

(51) Int. Cl.
   *H02M 7/5387*   (2007.01)
   *H02P 21/22*    (2016.01)
   *H02M 1/00*     (2006.01)
   *H02P 21/14*    (2016.01)

(52) U.S. Cl.
   CPC ......... *H02M 7/53871* (2013.01); *H02M 1/00* (2013.01); *H02P 21/14* (2013.01); *H02P 21/22* (2016.02); *H02M 2001/0009* (2013.01)

(58) Field of Classification Search
   CPC ............... H02M 7/53871; H02M 1/00; H02M 2001/0009; H02P 21/22; H02P 21/14
   USPC .................................................. 318/400.02
   See application file for complete search history.

(56) References Cited

U.S. PATENT DOCUMENTS

2020/0186147 A1*   6/2020   Shigeta ................... H02J 9/062

FOREIGN PATENT DOCUMENTS

| EP | 2 234 262 A1 | 9/2010 |
| JP | 08-111930 A | 4/1996 |
| JP | 2004-120883 A | 4/2004 |
| JP | 2007-202299 A | 8/2007 |
| JP | 2009-219174 A | 9/2009 |

OTHER PUBLICATIONS

International Search Report dated Aug. 29, 2017 in PCT/JP2017/026514 filed on Jul. 21, 2017, citing documents AP-AR therein, 2 pages.

* cited by examiner

*Primary Examiner* — Kawing Chan
(74) *Attorney, Agent, or Firm* — Oblon, McClelland, Maier & Neustadt, L.L.P.

(57) ABSTRACT

A power conversion apparatus with an arm fuse melting detector for detecting an arm fuse melting from a ripple current without using a micro switch. The power conversion apparatus includes an inverter for driving a motor, an arm fuse provided in each of U-phase, V-phase, and W-phase arms of the inverter, and a first arm fuse melting detector to detect the arm fuse melting. The first arm fuse melting detector includes a DQ conversion circuit that converts the inverter output current into the D-axis/Q-axis current, an absolute value calculation circuit for calculating the absolute value from the output of the DQ conversion circuit, a ripple current calculator for calculating a ripple current from the difference between the maximum value and the minimum value of the absolute value for each cycle period T of the fundamental wave of the inverter output.

8 Claims, 6 Drawing Sheets

POWER CONVERSION APPARATUS

CROSS-REFERENCE TO RELATED APPLICATION

This application is based upon and claims the benefit of priority from the prior PCT Patent Application No. PCT/JP2017/26514, filed on Jul. 21, 2017, the entire contents of which are incorporated herein by reference.

TECHNICAL FIELD

The embodiment of this invention is related with a power conversion apparatus with an arm fuse melting detector.

BACKGROUND ART

Conventionally, actions of micro switch has been used to detect the melting of an arm fuse in a three-phase inverter constituting a power converter.
(See Patent Document 1).

PRIOR ART DOCUMENT

Patent Document

Patent Document 1: Japanese Patent Application Publication No. 2007-202299

SUMMARY OF THE INVENTION

Problem to be Solved by the Invention

However, the micro switch applied to the detection of melting of the high-voltage fuse does not have an automatic return function, and there was a problem that the switch may cause a malfunction such as stopping the power converter due to false detection when the switch operates by vibration or the like.

The present invention has been made in order to solve the above-described problems, and without using a micro switch, power conversion apparatus is provided with an arm fuse melting detection means for detecting an arm fuse melting from a ripple current at the time of the arm fuse melting.

Means for Solving the Problem

In order to achieve the above object, a power conversion apparatus with an arm fuse melting detector according to claim 1 of the present invention comprises, an inverter that drives an AC motor in variable speed by receiving a power from power supply, an arm fuse provided in each phase arm of the U-phase arm, V-phase arm and W-phase arm constituting the inverter, a first arm fuse melting detector for detecting melting of each arm fuse, and the first arm fuse melting detector involves a current detector for detecting the three-phase output current of the inverter, a conversion circuit for converting three-phase current detected by the current detector into two-axis current components orthogonal to each other, a first absolute value calculator for calculating the absolute value from the output of the conversion circuit, a first ripple current calculator for calculating a ripple current from the difference between the maximum value and the minimum value of the absolute value calculated by the first absolute value calculator for each cycle period T of the fundamental wave of the inverter output, a first comparator that compares the ripple current calculated by the first ripple current calculator with a set first threshold value, a first threshold value determining circuit for determining the first threshold value by multiplying a current command value of the inverter by a predetermined first coefficient, wherein, the first comparator operates when the ripple current is equal to or greater than the first threshold, and is determined that the arm fuse is melted.

Effects of the Invention

According to the present embodiment, since it is possible to detect the arm fuse melting of the inverter without depending on the macro switch, it is possible to prevent the false detection of the arm fuse melting due to the malfunction of the micro switch, and a malfunction such as a stop operation of the power conversion apparatus can be prevented.

EMBODIMENT TO PRACTICE THE INVENTION

Hereinafter, embodiments of the present invention will be described with reference to the drawings.

Embodiment 1

Figure 1:
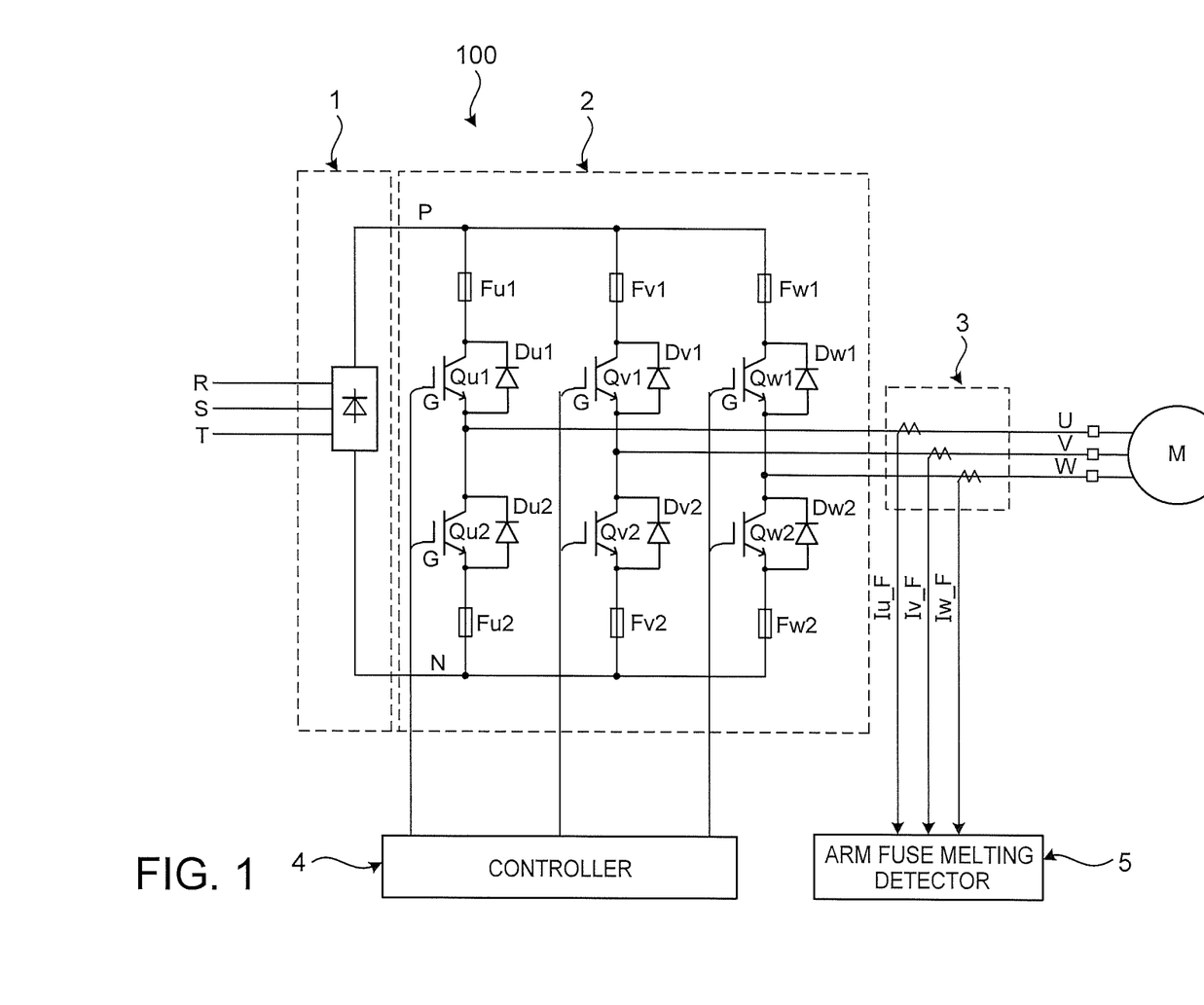
FIG. 1 schematic configuration diagram of the power conversion apparatus and a power conversion system including a motor connected to the power conversion apparatus according to a first embodiment.

FIG. 1 is a schematic configuration diagram of the power conversion apparatus 100 including the arm fuse melting detector and a power conversion system including a motor M connected to the power conversion apparatus 100 according to the first embodiment.

The illustrated power conversion apparatus 100 includes a converter 1, an inverter 2, a current detector 3, a controller 4, and an arm fuse melting detector 5.

The converter 1 converts a three-phase AC power source R (R phase), S (S phase), and T (T phase) into a DC power source composed of a P phase (positive electrode) and an N phase (negative electrode), and supply the DC power to the inverter 2.

The inverter 2 consists of a three-phase arm includes a U-phase arm (generic name for U-phase upper arm and U-phase lower arm), a V-phase arm (generic name for V-phase upper arm and V-phase lower arm), and a W-phase arm (generic name for W-phase upper arm and W-phase lower arm). It converts the DC power supplied from the converter 1 into the three-phase AC power (U phase, V phase, and W phase) required to drive the motor M.

In the U-phase upper arm, an arm fuse Fu1 is connected between the P-phase and the collector of the switching element Qu1, and in the U-phase lower arm, an arm fuse Fu2 is connected between the N-phase and the emitter of the switching element Qu2. The emitter of the switching element Qu1 and the collector of the switching element Qu2 are connected, and the connection point is connected to the U-phase AC input terminal of the motor M via the current detector 3. Diodes Du1 and Du2 are connected in antiparallel to the switching elements Qu1 and Qu2, respectively. The gates G of the switching elements Qu1 and Qu2 are connected to the controller 4. The switching elements Qu1 and Qu2 perform a switching operation by the gate signal output from the controller 4 and output the U phase of the three-phase AC power supply (U phase output of the inverter).

In the V-phase upper arm, an arm fuse Fv1 is connected between the P-phase and the collector of the switching element Qv1, and in the V-phase lower arm, an arm fuse Fv2 is connected between the N-phase and the emitter of the switching element Qv2. The emitter of the switching element Qv1 and the collector of the switching element Qv2 are connected, and the connection point is connected to the V-phase AC input terminal of the motor M via the current detector 3. Diodes Dv1 and Dv2 are connected in antiparallel to the switching elements Qv1 and Qv2, respectively. The gates G of the switching elements Qv1 and Qv2 are connected to the controller 4. The switching elements Qv1 and Qv2 perform a switching operation by the gate signal output from the controller 4 and output the V phase of the three-phase AC power supply (V phase output of the inverter).

In the W-phase upper arm, an arm fuse Fw1 is connected between the P-phase and the collector of the switching element Qw1, and in the W-phase lower arm, an arm fuse Fw2 is connected between the N-phase and the emitter of the switching element Qw2. The emitter of the switching element Qw1 and the collector of the switching element Qw2 are connected, and the connection point is connected to the W-phase AC input terminal of the motor M via the current detector 3. Diodes Dw1 and Dw2 are connected in antiparallel to the switching elements Qw1 and Qw2, respectively. The gates G of the switching elements Qw1 and Qw2 are connected to the controller 4. The switching elements Qw1 and Qw2 perform a switching operation by the gate signal output from the controller 4 and output the W phase of the three-phase AC power supply (W phase output of the inverter).

The current detector 3 detects a U-phase output current $Iu\_F$, a V-phase output current $Iv\_F$, and a W-phase output current $Iw\_F$ of the inverter and outputs them to the arm fuse melting detector 5.

The controller 4 converts a speed command from a host controller (not shown) into a two-axis value composed of D-axis current command value and a Q-axis current command value that are orthogonal to each other. The controller 4 uses an U-phase output current $Iu\_F$, a V-phase output current $Iv\_F$, and a W-phase output current $Iw\_F$ of the inverter from the current detector 3, and these are converted to a D-axis current feedback value and a Q-axis current feedback value in the current command calculation circuit in the controller. These two axes are orthogonal to each other. The controller 4 outputs gate signal to the gate G of the switching elements Qu1, Qu2, Qv1, Qv2, Qw1 and Qw2 of the inverter 2 so that the D-axis current feedback value and the Q-axis current feedback value follow the D-axis current command value and the Q-axis current command value, respectively.

In this way, the motor M is driven in variable speed.

Since the controller 4 is a main controller to control the switching elements Qu1 and Qu2 that constitute the U-phase upper arm and lower arm, switching elements Qv1 and Qv2 that constitute the V-phase upper arm and lower arm, and the switching elements Qw1 and Qw2 constituting a W-phase upper arm and lower arm, these constitute the inverter 2, FIG. 1 illustrates the case where the controller 4 is not included in the inverter 2, but the same effect can be obtained when the controller 4 is included in the inverter 2. Either case is included in the scope of the present invention.

Moreover, although the converter 1 illustrated the case where it was not controlled by the gate signal output from the controller 4, like the gate control of the inverter 2, when the converter 1 is comprised with a switching element, it may be controlled by a gate output signal from the controller 4. Either case is included in the scope of the present invention. Based on the above, the following explanation will be given.

The arm fuse melting detector 5 receives the U phase output current $Iu\_F$, V phase output current $Iv\_F$, and W phase output current $Iw\_F$ of the inverter output from the current detector 3, and detects the melting of the arm fuse.

Figure 2:
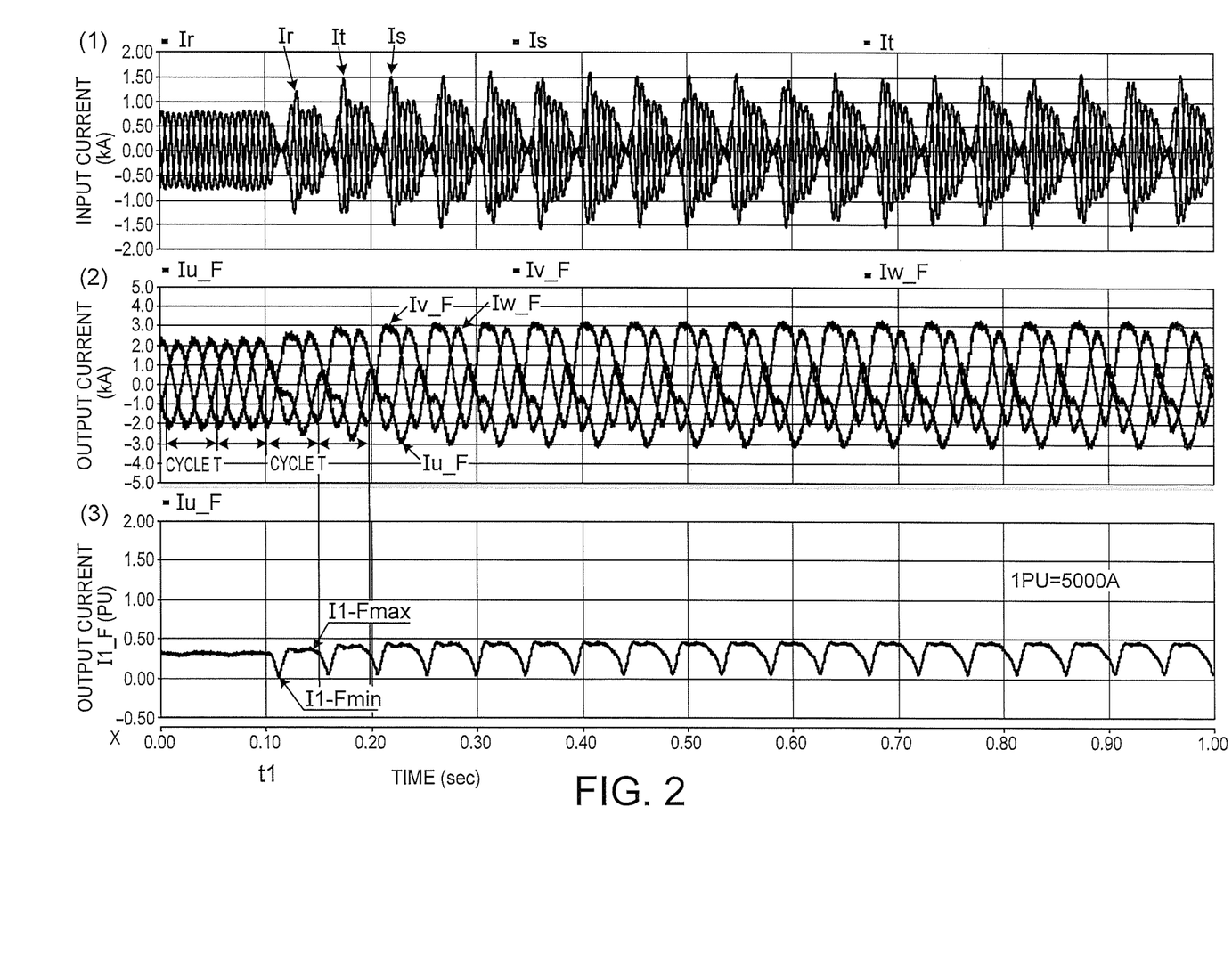
FIG. 2 A diagram showing input/output current waveforms of the power conversion apparatus before and after a detection of U-phase arm fuse melting.

FIG. 2 is a diagram showing input/output current waveforms before and after melting when the U-phase arm fuse is melted at time t1. FIG. 2 (1) is an example of the waveforms of the three-phase alternating currents Ir, Is, and It inputted to the converter 1 from the three-phase alternating current power sources R, S, T. FIG. 2 (2) is an example of a U-phase output current $Iu\_F$, a V-phase output current $Iv\_F$, and a W-phase output current $Iw\_F$. FIG. 2 (3) is an example of the waveform of the inverter output current $I1\_F$. With reference to these drawings, the arm fuse melting detection method according to the present embodiment will be described.

Figure 3:
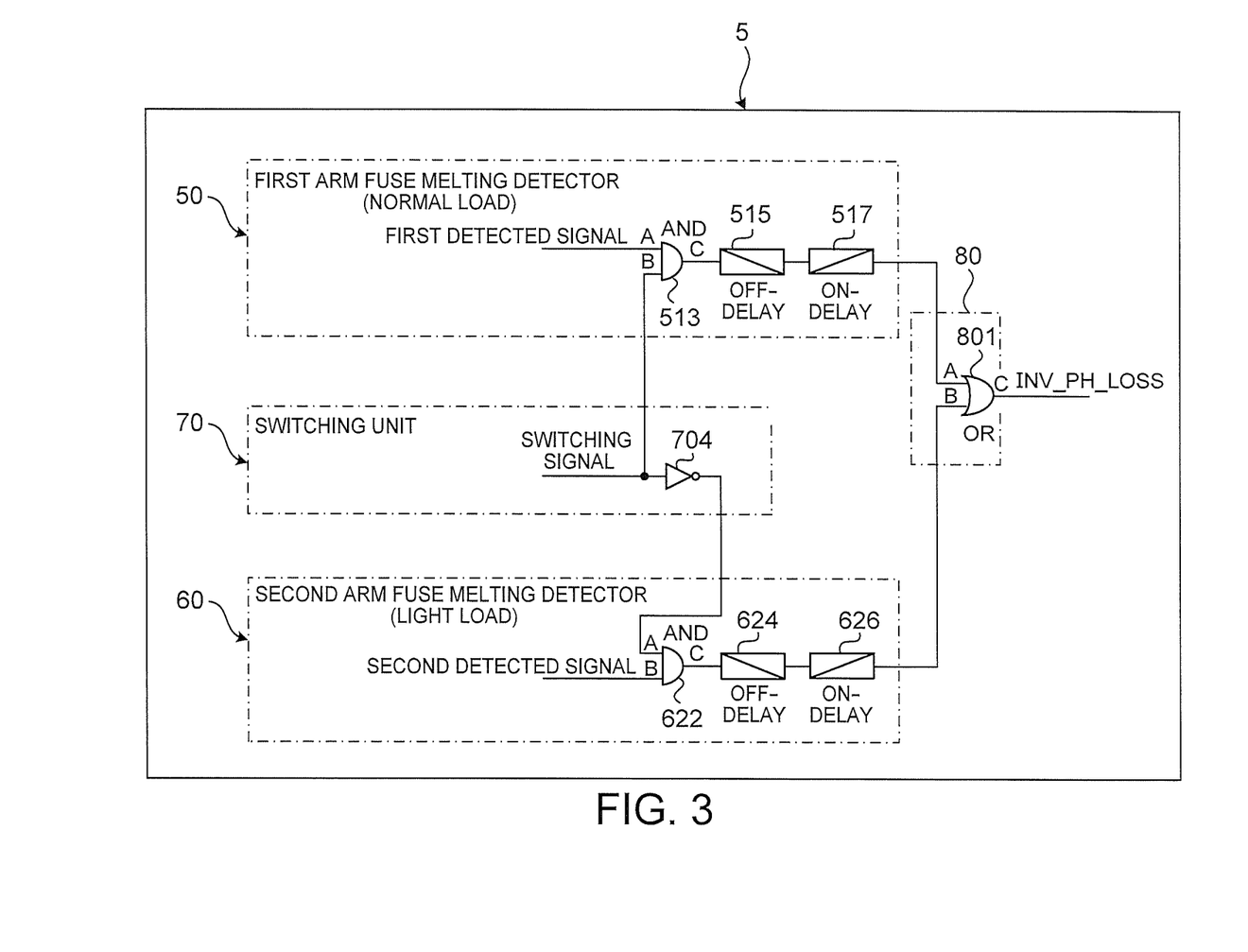
FIG. 3 A block diagram showing a configuration of an arm fuse melting detector 5 shown in FIG. 1.
Figure 4A:
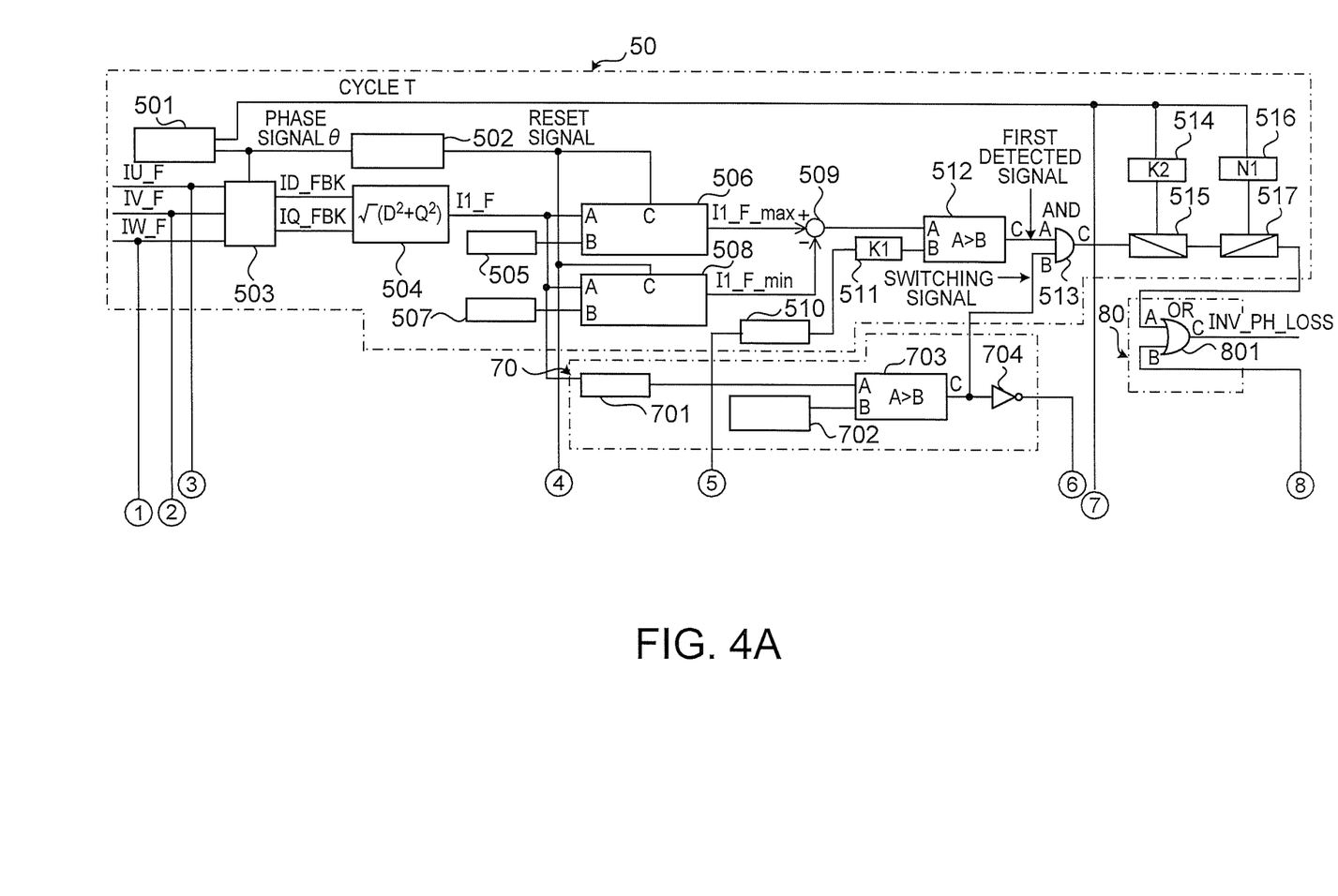
FIG. 4A, FIG. 4B Detailed view for explaining the operation of each part constituting the arm fuse melting detector 5 shown in FIG. 3.
Figure 4B:
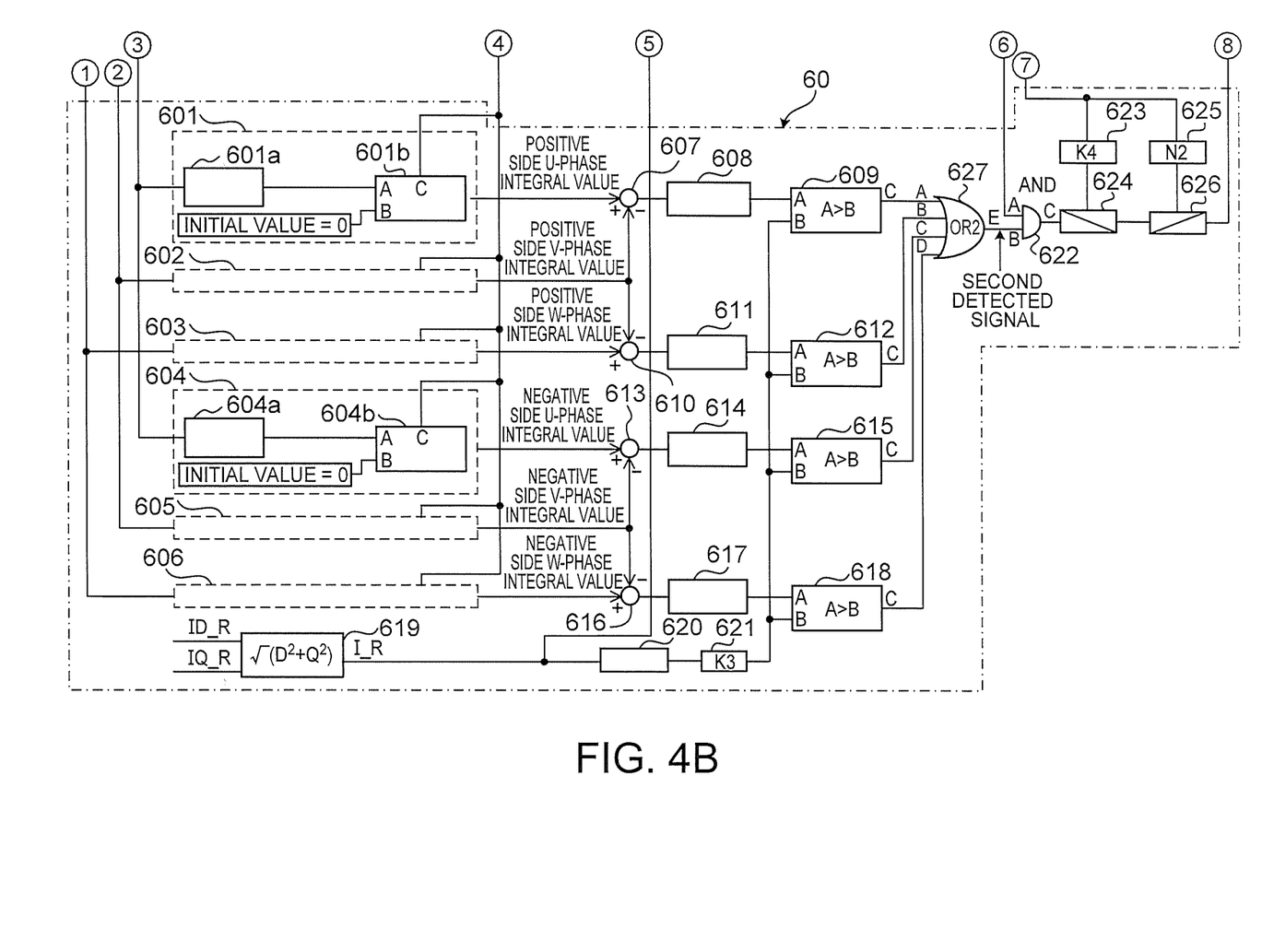

FIG. 3 is a block diagram showing a configuration of the arm fuse melting detector 5 shown in FIG. 1. The arm fuse melting detector 5 includes a first arm fuse melting detector 50, a second arm fuse melting detector 60, and a switching unit 70 and an arm fuse melting detection output unit 80. FIG. 4A and FIG. 4B are detailed view for explaining the operation of each part constituting the arm fuse melting detector 5 shown in FIG. 3. The first arm fuse melting detector 50 detects the melting of the arm fuse connected to each arm described above during normal load. The detection result is inputted to a terminal A of an AND 513 as a first detection result signal (1: arm fuse melted, 0: arm fuse not melted).

The switching unit 70 includes a comparator 703. The comparator 703 compares an inverter output current $I1\_F$, which will be described later, and that is a value inputted to the terminal A of the comparator 703 via a filter 701, and a light load setting value set in advance by a setting circuit 702 inputted to the terminal B. Thus, it is determined whether the load is a normal load or a light load, and the determination result is outputted from the terminal C of the comparator 703 as a switching signal (1: normal load, 0: light load). The output switching signal is inputted to a terminal B of a logical product 513.

An output signal of the logical product 513 is inputted to a signal processing circuit including an OFF-delay 515 and an ON-delay 517.

The first arm fuse melting detection according to the present embodiment is determined as the first arm fuse melting in the following cases as will be described later. That is, the absolute ripple current obtained by converting the three-phase output current of the inverter 2 into two-axis components orthogonal to each other exceeds a predetermined threshold value, and is selected by the switching signal, and these are continuously detected for a predetermined number of cycles (for example, 5 cycles) with a cycle period T described later as one cycle.

By using such an arm fuse melting detection method, it is possible to prevent erroneous detection. For this purpose, signal processing including the OFF-delay 515 and the ON-delay 517 is performed (details will be described later). The output signal of the ON-delay 517 is inputted to a terminal A of a logical sum 801 of the arm fuse melting detection output unit 80, and the arm fuse melting detection signal (INV_PH_LOSS) is outputted from the terminal C of the logical sum 801.

The second arm fuse melting detector 60 detects the melting of the arm fuse connected to each arm described above at light load. The detection result is inputted to a terminal B of a logical product 622 as a detection result signal (1: arm fuse melted, 0: arm fuse not melted).

The switching unit 70 inverts a signal outputted from the terminal C of a comparator 703 as a switching signal (1: normal load, 0: light load) by an inversion circuit 704 and inputs the inverted signal to the terminal A of a logical product 622.

The output signal of the logical product 622 is inputted to a signal processing circuit including an OFF-delay 624 and an ON-delay 626.

The second arm fuse melting detection according to the present embodiment is determined as the second arm fuse melting in the following cases as will be described later. That is, the phase imbalance of the values obtained by integrating the three-phase output current of the inverter unit 2 for each half cycle exceeds a predetermined threshold, and it is selected by the switching signal, and these are continuously detected for a predetermined number of cycles (for example, 5 cycles) with a cycle period T described later as one cycle. By using such an arm fuse melting detection method, it is possible to prevent erroneous detection. For this purpose, signal processing including the OFF-delay 624 and the ON delay-626 is performed (details will be described later). The output signal of the ON-delay 626 is inputted to the terminal B of the logical sum 801 of the arm fuse melting detection output unit 80, and the arm fuse melting detection signal (INV_PH_LOSS) is outputted from the terminal C of the logical sum 801.

When the arm fuse melting detection signal (INV_PH_LOSS) is outputted from the terminal C of the logical sum 801, appropriate protection interlock is performed by a protection circuit (not shown).

Figure 5:
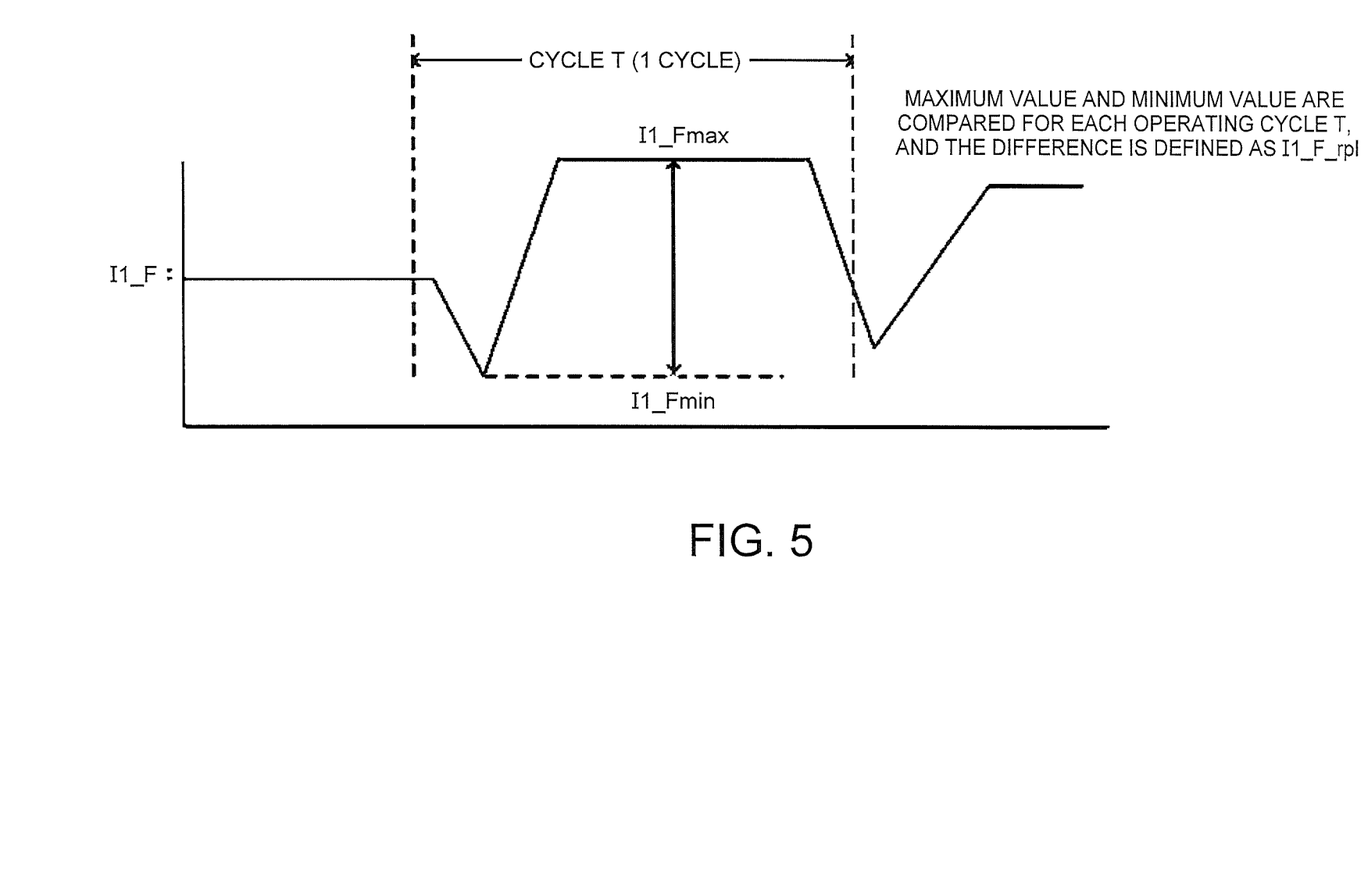
FIG. 5 A diagram for explaining a maximum value and a minimum value in a cycle T of an inverter output current.

FIG. 5 is a diagram for explaining the maximum value and the minimum value in the cycle period T of the inverter output current.

The first arm fuse melting detector 50 detects a melting of the arm fuse connected to each arm at the time of normal load, and it includes a phase detection circuit 501, a reset signal generation circuit 502, a DQ conversion circuit 503, an absolute value calculation circuit 504, a maximum value holding circuit 506, a minimum value holding circuit 508, a comparator 512, a logical product 513, an OFF-delay 515, an ON-delay 517, and the like.

The phase detection circuit 501 is a circuit that detects the electrical angle phase θ of the output of the inverter 2. It is possible to use an output of a phase synchronization circuit (PLL) used in a speed estimation circuit that uses the input terminal voltage of the motor M and the U-phase output current Iu_F, V-phase output current Iv_F, or W-phase output current Iw_F of the inverter unit 2 described above for detecting the electrical angle phase θ in the phase detection circuit 501. Or it may be detected using a signal from a rotation angle detector or a position sensor mechanically attached to the motor M.

The phase detection circuit 501 outputs the cycle period T, which is the period of the fundamental wave of the output voltage or output current of the inverter unit 2, and the phase signal θ by the method described above.

The phase signal θ is inputted to the reset signal generation circuit 502 and the DQ conversion circuit 503.

The reset signal generation circuit 502 outputs a reset signal once per cycle of the fundamental wave of the output voltage of the inverter unit 2 from the phase signal θ, and It is connected to the reset signal input terminal of each of the maximum value holding circuit 506, the minimum value holding circuit 508, a positive side U-phase integral value calculation circuit 601, a positive side V-phase integral value calculation circuit 602, a positive side W-phase integral value calculation circuit 603, a negative side U-phase integral value calculation circuit 604, a negative side V-phase integral value calculation circuit 605, and a negative side W-phase integral value calculation circuit 606, these will be described later.

The DQ conversion circuit 503 (conversion circuit) uses the phase signal θ as a reference signal, and converts a three-phase current composed of the input U-phase output current Iu_F, V-phase output current Iv_F, and W-phase output current Iw_F of the inverter unit 2 into a biaxial vector current composed of a D-axis and a Q-axis orthogonal to each other, and generates D-axis current ID_FBK and a Q-axis current IQ_FBK.

The absolute value calculation circuit 504 (first absolute value calculation circuit) calculates an absolute value current I1_F from the D-axis current ID_FBK and the Q-axis current IQ_FBK generated by the DQ conversion circuit 503. Since the absolute value current I1_F is an inverter output current (load current) outputted from the inverter 2, it may be hereinafter referred to as an inverter output current. The inverter output current I1_F is calculated by the following equation (1).

$$I1\_F = \sqrt{(ID\_FBK)^2 + (IQ\_FBK)^2} \qquad (1)$$

The inverter output current I1_F is inputted to an A input terminal of the maximum value holding circuit 506, an A input terminal of the minimum value holding circuit 508, and an input terminal of the filter 2.

The maximum value holding circuit 506 detects and holds a large inverter output current I_F when the inverter output current I1_F calculated by the absolute value calculation circuit 504 is larger than the current value set by a setting circuit 505 as the initial value 1. At the same time, the inverter output current I1_F is set as a new initial value. With this setting, the initial value is updated. When the inverter output current I1_F is larger than the updated initial value, the large inverter output current I1_F is detected and held, and the inverter output current I1_F is set as a new initial value. By repeating this process, the maximum value I1_Fmax of the inverter output current is detected and held (see FIG. 5). The held maximum value I1_Fmax of the inverter output current is reset to the initial value 1 set by the setting circuit 505, by the reset signal outputted from the reset signal generation circuit 502 every cycle period T.

The minimum value holding circuit 508 detects and holds the small inverter output current I1_F when the inverter output current I1_F calculated by the absolute value calculation circuit 504 is smaller than the current value set by a setting circuit 507 as the initial value 2. At the same time, the inverter output current I1_F is set as a new initial value. With this setting, the initial value is updated. When the inverter output current I1_F is smaller than the updated initial value, the small inverter output current I1_F is detected and held, and the inverter output current I1_F is set as a new initial value. By repeating this process, the minimum value I1_Fmin of the inverter output current is detected and held (see FIG. 5). The held minimum value I1_Fmin of the inverter output current is reset to the initial value 2 set by the setting circuit 507, by the reset signal outputted from the reset signal generation circuit 502 every cycle period T.

A subtraction circuit 509 calculates a difference obtained by subtracting the minimum value I1_Fmin of the inverter output current outputted from the minimum value holding circuit 508 from the maximum value I1_Fmax of the inverter output current outputted from the maximum value holding circuit 506. Then a ripple current I1_Frpl at normal load is calculated (see FIG. 5; first ripple current calculator). The difference obtained by subtracting the minimum value I1_Fmin from the maximum value I1_Fmax of the inverter output current indicates the ripple current I1_Frpl at the normal load, and as is apparent from FIG. 2 (3), the normal load ripple current I1_Frpl at the time shows a small value before the time t1 when the arm fuse melted, but shows a large value after the time t1 when the arm fuse melted. The calculated ripple current I1_Frpl at the normal load is inputted to a terminal A of the comparator 512.

The comparator 512 (first comparator) compares whether the ripple current at the normal load inputted to a terminal A exceeds the threshold value (first threshold value) inputted to a terminal B. The threshold value is set by the following method.

The absolute value calculation circuit 619 calculates the absolute value of the current command value I_R (hereinafter referred to as the current command value) from the D-axis current command value ID_R and the Q-axis current command value ID_Q of the inverter output current converted into two-axis components orthogonal to each other by an inverter output current control circuit (not shown). The current command value I_R is calculated by a following equation (2).

$$I\_R = \sqrt{(ID\_R)^2 + (IQ\_R)^2} \quad (2)$$

In FIG. 4, the absolute value calculation circuit 619 is shown in the second arm fuse melting detector 60, however, since the output of the absolute value detection circuit 619 is also used by the first arm fuse melting detector 50, the absolute value detection circuit 619 may be provided in the first arm fuse melting detector 50. Alternatively, it may be provided in an inverter output current control circuit unit (not shown).

The current command value I_R is smoothed by a filter 510, further multiplied by a proportional gain K1 by a proportional circuit 511, and inputted to the B terminal of the comparator 512 as a threshold value. That is, the threshold value of the comparator 512 is set to a value proportional to the current command value I_R. The filter 510 is a first-order lag element, and is used for the purpose of removing high-frequency noise.

The result of the comparison is inputted to a terminal A of the logical product 513. A switching signal that is the output of the comparator 703 described in FIG. 3 is inputted to a terminal B of the logical product 513.

During normal load, the switching signal that is the output of the comparator 703 is 1 (High Level).

Therefore, when the arm fuse melting is detected, 1 (High Level) is outputted from the comparator 512, and 1 (High Level) is also outputted from the logical product 513.

The output signal of the logical product 513 is inputted to a signal processing circuit including an OFF-delay 515 and an ON-delay 517.

The cycle period T of the fundamental wave of the inverter output outputted from the phase detection circuit 501 is inputted as a set value of the OFF-delay time of the OFF-delay 515 by multiplying a gain K2 by a proportional circuit 514. The OFF-delay 515 delays the OFF timing of the input signal for a period set by the output of the proportional circuit 514. In the case of this embodiment, even when the arm fuse is melted, the output of the comparator 512 may be chattered during the fundamental wave cycle, so that the OFF-delay 515 generates a continuous signal. The value of the gain K2 is set to about 1.2, for example. With this setting, the output signal becomes a continuous signal even if the input of the OFF-delay 515 is chattered during the fundamental wave cycle.

Further, the cycle period T of the fundamental wave of the inverter output outputted from the phase detection circuit 501 is inputted as a set value of the ON-delay time of the ON-delay 517 by multiplying a gain N1 by a proportional circuit 516.

The ON-delay 517 sets the output to 1 (High Level) when the input signal continues for the time set by the output of the proportional circuit 516 or more.

From a viewpoint of preventing unnecessary operation, it is desirable to detect an occurrence of the arm fuse melting when the ripple current I1_Frpl exceeds the threshold continuously for several cycles (first cycle) at the fundamental wave cycle period T, so the value to be used is a value corresponding to several cycles. For example, in the case of 5 cycles, the set gain N1 of the proportional circuit 516 is set to 5. As a result, the ON-delay setting value becomes five times the cycle period T, and the ON-delay 517 sets the output to 1 (High Level) when the ripple current I1_Frpl exceeds the threshold value for five consecutive cycles.

This setting detects the occurrence of arm fuse melting when the ripple current at the normal load exceeding the predetermined threshold continues for the number of cycles. The output of this ON delay-517 becomes the output of the first arm fuse melting detector 50. In FIG. 4, the detection when the ripple current I1_Frpl exceeds the threshold value for several consecutive cycles at the fundamental wave period T is configured by the combination of the OFF-delay 515 and the ON-delay 517, but the same function may be configured by combining the counter circuit.

The output signal of the ON delay-517 is inputted to a terminal A of the logical sum 801 of the arm fuse melting detection output unit 80, and the arm fuse melting detection signal (INV_PH_LOSS) is outputted from the terminal C of the logical sum 801.

When an arm fuse melting detection signal (INV_PH_LOSS) is outputted from a terminal C of the logical sum 801, appropriate protection interlock is performed by a protection circuit (not shown).

The second arm fuse melting detector 60 detects the melting of the arm fuse connected to each arm at the time of light load, and it includes the positive U phase integral value calculation circuit 601, the positive V phase integral value calculation circuit 602, the positive-side W-phase integral value calculation circuit 603, the negative-side U-phase integral value calculation circuit 604, the negative-side V-phase integral value calculation circuit 605, the negative-side W-phase integral value calculation circuit 606, subtraction circuits 607, 610, 613, 616, absolute value calculation circuits 619, 608, 611, 614, 617, comparators 609, 612, 615, 618, a logical sum 627, a logical product 622, an OFF-delay 624, an ON-delay 626, and the like.

Before the arm fuse is melted, the U-phase output current Iu_F and the V-phase output current Iv_F are out of phase as shown before time t1 in FIG. 2 (2), since the values integrated over the cycle period T show substantially the same current value, the difference between the integrated values, that is, the unbalance, becomes a small value.

On the other hand, when the U-phase arm fuse is melted as shown after time t1 in FIG. 2 (2), the U-phase output current Iu_F is affected by the U-phase arm fuse melting after the arm fuse is melted. It fluctuates greatly compared to before the fuse is melted, the current component in the positive direction is small, and the current component in the negative direction is reduced. In addition to the U-phase output current Iu_F, the V-phase output current Iv_F and the W-phase output current Iw_F are also affected by the U-phase arm fuse melting, and fluctuate greatly compared to before the arm fuse melting.

Therefore, when the arm fuse is melted, the current value of each phase for one cycle is integrated in the forward or reverse unit, and compared with the integrated value of the current value in the same direction of the other phase, and when the difference (the unbalance) is large at this comparison, it can be determined that the arm fuse has melted.

An arm fuse melting detection circuit will be described by means for detecting current phase imbalance based on the above principle.

The U-phase output current Iu_F of the inverter is inputted to the positive side U-phase integral value calculation circuit 601, and integration thereof is performed by an integration circuit 601b via a limiter circuit 601a having a lower limit value of 0. The integral value calculated by the integration circuit 601b is cleared by a reset signal output from the reset signal generating circuit 502 every cycle period T, and the initial value is set to zero. In this way, the integral value of the current in the positive direction during the cycle period T (one cycle) of the U-phase output of the inverter is calculated. This value is called a positive side U-phase integral value. The output of the integration circuit 601b is the output of the positive side U-phase integration value calculation circuit 601. The positive side U-phase integral value outputted from the positive side U-phase integral value calculation circuit 601 is outputted to a plus side terminal of the subtraction circuit 607.

Similarly to the calculation method of the positive side U-phase integral value, the positive side V-phase integral value calculation circuit 602 calculates the integral value of the positive side current of the inverter V-phase output current Iv_F in the cycle period T. This value is called a positive side V-phase integral value. The calculated positive side V-phase integral value is outputted to the minus side terminals of the subtraction circuits 607 and 610.

Further, similarly, the positive-side W-phase integral value calculation circuit 603 calculates the integral value of the positive-side current of the inverter W-phase output current Iw_F in the cycle period T. This value is called the positive side W-phase integral value. The calculated positive side W-phase integral value is outputted to the plus side terminal of the subtraction circuit 610.

The U-phase output current Iu_F of the inverter is inputted to the negative-side U-phase integral value calculation circuit 604, and integration thereof is performed by an integration circuit 604b via a limiter circuit 604a having an upper limit value of 0. The integral value calculated by the integration circuit 604b is cleared by a reset signal output every cycle period T from the reset signal 502, and the initial value is set to zero. In this way, the integral value of the current in the negative direction during the cycle period T (one cycle) of the U-phase output of the inverter is calculated. This value is called a negative side U-phase integral value. The output of the integration circuit 604b is the output of the negative side U-phase integration value calculation circuit 604. The positive side U-phase integral value outputted from the negative side U-phase integral value calculation circuit 604 is outputted to the plus side terminal of the subtraction circuit 613.

Similarly to the negative side U-phase integral value calculation method, the negative side V-phase integral value calculation circuit 605 calculates the integral value of the negative side current of the inverter V-phase output current Iv_F in the cycle period T. This value is called a negative side V-phase integral value. The calculated negative V-phase integral value is outputted to the minus side terminals of the subtraction circuits 613 and 616.

Further, similarly, the negative side W-phase integral value calculation circuit 606 calculates the integral value of the negative side current of the W phase output current Iw_F of the inverter in the cycle period T. This value is referred to as a negative side W-phase integral value. The calculated negative side W-phase integral value is outputted to the plus side terminal of the subtraction circuit 616.

The subtraction circuit 607 calculates a difference between the positive side U-phase integration value and the positive side V-phase integration value, and outputs the difference to the absolute value calculation circuit 609. Since in the absolute value calculation circuit 608, the positive side U-phase integral value and the positive side V-phase integral value are both positive values, but the subtraction result by the subtraction circuit 607 can take positive and negative values. The absolute value of the difference between the positive-side U-phase integral value and the positive-side V-phase integral value is calculated and outputted.

A comparator 609 compares whether the output of the absolute value calculation circuit 608 inputted to the terminal A (ripple current at light load) is equal to or higher than a threshold inputted to the terminal B. The comparison result is outputted from terminal C of the comparator 609 and inputted to a terminal A of the logical sum 627.

The threshold is set by the following method. The current command value I_R outputted from the absolute value calculation circuit 619 is smoothed by a filter 620, further multiplied by a proportional gain K3 by a proportional circuit 621, and inputted as a threshold value to the B terminal of the comparator 609 (second threshold value decision means). That is, the threshold value of the comparator 609 is set to a value proportional to the current command value I_R.

The filter 620 is a first-order lag element and is used for the purpose of removing high-frequency noise.

Since the frequency used is different between the first arm fuse melting part 50 used at normal load and the second arm fuse melting part 60 used at light load, an optimum time constant according to the load is preferably selected.

The comparator 609 (second comparator) outputs 1 (High Level) when the A terminal input (that is an output of the absolute value calculation circuit 608) is equal to or higher than the B terminal input (second threshold) that is the output of the proportional circuit 621.

In this way, the arm fuse melting detection result based on the difference between the positive side U-phase integral value and the positive side V-phase integral value is inputted to a terminal A of a logical sum 627.

A subtraction circuit 610 calculates the difference between the positive W-phase integral value and the positive V-phase integral value. The absolute value of the difference of the subtraction circuit 610 is calculated by an absolute value calculation circuit 611 (second current imbalance calculation means) and inputted to the terminal A of the comparator 612 (third comparator). The signal is inputted from the terminal A of the comparator 612 to the terminal B of the logical sum 627. Since the operations of the absolute value calculation circuit 611 and the comparator 612 are the same as the operations of the absolute value calculation circuit 608 and the comparator 609 described above, description thereof is omitted.

Similarly to the calculation method of the negative side U-phase integral value, a negative side V-phase integral value calculation circuit 605 calculate the integral value of the negative side (negative side not exceeding the upper limit limiter) current of the inverter V-phase output current Iv_F in a cycle period T. The calculated positive side V-phase integral value is outputted to the minus side terminals of the subtraction circuits 613 and 616.

The subtraction circuit 613 calculates the difference between the negative side U-phase integral value and the negative side V-phase integral value. The absolute value of the difference of the subtraction circuit 613 is calculated by an absolute value calculation circuit 614 (third current imbalance calculator) and inputted to the terminal A of a comparator 615 (fourth comparator). The signal is inputted from the terminal C of the comparator 615 to a terminal C of the logical sum 627.

The subtraction circuit 616 calculates the difference between the negative W-phase integral value and the negative V-phase integral value. The absolute value of the difference of the subtraction circuit 616 is calculated by an absolute value calculation circuit 617 (fourth current imbalance calculator) and inputted to a terminal A of a comparator 618 (fifth comparator). The signal is inputted from the terminal C of the comparator 618 to the terminal D of the logical sum 627. Since the operations of the absolute value calculation circuit 617 and the comparator 618 are the same as the operations of the absolute value calculation circuit 608 and the comparator 609 described above, description thereof is omitted.

In addition, not only the combination of each phase integration value mentioned above, but from the difference of at least any two of the positive side U-phase integration value, the V-phase integration value, and the W-phase integration value, and also any two of the negative U-phase integration value, the negative-side V-phase integral value, and the negative-side W-phase integral value, the unbalance between the currents can be calculated. (First to fourth current imbalance calculator.) The switching signal (1: normal load, 0: light load) described in FIG. 3 is inverted and input to a terminal A of a logical product 622 by an inverting circuit 704. When detecting the arm fuse melted at light load, 0 (Low Level) is outputted from the comparator 703 (sixth comparator) as a switching signal, but is inverted by the inverting circuit 704 and inputted to the terminal A of the logical product 622.

The output signal of the logical product 622 is inputted to the OFF-delay 624, and the output is further inputted to the ON-delay 626.

The cycle period T of the fundamental wave of the inverter output outputted from the phase detection circuit 501 is inputted as a set value of the OFF-delay time of the OFF-delay 624 by multiplying a gain K4 by a proportional circuit 623. Further, the cycle period T of the fundamental wave of the inverter output outputted from the phase detection circuit 501 is inputted as a set value of the ON-delay time of the ON-delay 626 by multiplying a gain N2 by a proportional circuit 625.

The setting of the gain K2 is set so that the output of the logical product 622 becomes a continuous signal when the arm fuse is melted even when a direct output of the logical product 622 is chattering signal within the period of T1, in the same manner as setting of the gain K1 described above. The gain N2 is set so that the ON-delay 626 outputs an arm fuse melting signal when the signal continues for several cycles (second cycle) as setting of the gain N1.

Since the operations of the OFF-delay 624 and the ON-delay 626 are the same as the operations of the above-described OFF-delay 515 and the ON-delay 517, description thereof will be omitted.

The output signal of the ON-delay 626 is inputted to the terminal B of the logical sum 801 of the arm fuse melting detection output unit 80, and the arm fuse melting detection signal (INV_PH_LOSS) is outputted from the terminal C of the logical sum 801.

When an arm fuse melting detection signal (INV_PH_LOSS) is outputted from the terminal C of the logical sum 801, appropriate protection interlock is performed by a protection circuit (not shown).

As described above, according to the embodiment, it is possible to reliably detect the melting of the arm fuse during both normal load and light load.

As described above, according to the embodiment of the present invention, the arm fuse melting can be detected from the output current of the power conversion apparatus without using the micro switch. It is possible to provide a power conversion apparatus including an arm fuse melting detector that can prevent malfunctions such as stopping the operation.

While certain embodiment have been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

For example, a power conversion apparatus using only the first arm fuse melting detector 50 is also effective. In this case, the detection accuracy is reduced when the load is light, but there is no problem as long as the operation region is only a normal load. Conversely, a power conversion apparatus using only the second arm fuse melting detector 60 is also effective. In this case, although the detection accuracy decreases as the load increases, there is a possibility that even when normal load, arm fuse melting can be detected by optimizing control constants of the detector.

DESCRIPTION OF THE SYMBOLS

1 Converter
2 Inverter
3 Current detector
4 Controller
5 Arm fuse melting detector
50 First arm fuse melting detector
501 Phase detection circuit
502 Reset signal generation circuit 503 DQ conversion circuit
504 Absolute value calculation circuit
506 Maximum value holding circuit
508 Minimum value holding circuit
509 Subtraction circuit
512 Comparator 1
60 Second arm fuse melting detector
601 Positive side U-phase integral value calculation circuit
602 Positive side V-phase integral value calculation circuit
603 Positive side W-phase integral value calculation circuit
604 Negative side U phase integral value calculation circuit
605 negative side V-phase integral value calculation circuit
606 Negative side W-phase integral value calculation circuit
608, 611, 614, 617, 619 Absolute value calculation circuit
609, 612, 615, 618 comparator
70 switching part
703 Comparator

The invention claimed is:

1. A power conversion apparatus, comprising:
an inverter that drives an AC motor in variable speed by receiving a power from power supply;
an arm fuse provided in each phase arm of the U-phase arm, V-phase arm and W-phase arm constituting the inverter;
a first arm fuse melting detector detects melting of each arm fuse, the first arm fuse melting detector involves:
a current detector detects the three-phase output current of the inverter;
a conversion circuit converts three-phase current detected by the current detector into two-axis current components orthogonal to each other;
a first absolute value calculator calculates the absolute value from the output of the conversion circuit;
a first ripple current calculator calculates a ripple current from the difference between the maximum value and the minimum value of the absolute value calculated by the first absolute value calculator for each cycle period T of the fundamental wave of the inverter output;
a first comparator that compares the ripple current calculated by the first ripple current calculator with a set first threshold value;
a first threshold value determining circuit determines the first threshold value by multiplying a current command value of the inverter by a predetermined first coefficient,
wherein, the first comparator operates when the ripple current is equal to or greater than the first threshold, when the first comparator is operated, it is determined that the arm fuse is melted, and
operation of the power conversion apparatus is stopped when it is determined that any of the arm fuses is melted.

2. A power conversion apparatus, comprising:
an inverter that drives an AC motor invariable speed by receiving a power from power supply;
an arm fuse provided in each phase arm of the U-phase arm, V-phase arm and W-phase arm constituting the inverter;
the first arm fuse melting detector cited in claim 1;
a positive-side U-phase integral value computing circuit, a positive-side V-phase integral value computing circuit, and a positive-side W phase integral value computing circuit integrate the positive direction component of the output current of each phase of the inverter for one cycle of the fundamental wave of the inverter output;
a negative side U-phase integral value computing circuit, a negative side V-phase integral value computing circuit, and a negative side W phase integral value computing circuit integrate the negative direction component of the output current of each phase of the inverter for one cycle of the fundamental wave of the inverter output;
first to fourth current unbalance calculators including a circuit outputs a current unbalance from a difference between at least any two of the phase integral values of the positive side U-phase integral value, the positive side V-phase integral value and the positive side W-phase integral value, or any two of the phase integral values of the negative side U-phase integral value, the negative side V-phase integral value and the negative side W-phase integral value, and further including a circuit calculates an absolute value thereof;
second to fifth comparators compare the outputs of the first to fourth current imbalance calculators with a set second threshold, respectively;
a second threshold value determining circuit determines the second threshold value by multiplying the current command value of the inverter by a predetermined second coefficient,
wherein, the second to fifth comparators operate when the outputs of the first to fourth current imbalance calculators are equal to or higher than the second threshold, respectively, and when anyone of the second to fifth comparators is operated, it is determined that an arm fuse is melted, and
operation of the power conversion apparatus is stopped when it is determined that any of the arm fuses is melted;
a sixth comparator compares the inverter output current with a predetermined light load set value,
wherein, the sixth comparator operates when the inverter output current is equal to or higher than the light load set value, and it is determined as a normal load during the sixth comparator is operating, it is determined that the load is light during the sixth comparator is not operating, and the first arm fuse melting detector is selected during the normal load, and the second arm fuse melting detector is selected during the light load.

3. The power conversion apparatus according to claim 1, wherein, the first arm fuse melting detector determines the fuse melting, when the first comparator continues for a predetermined first cycle period based on the fundamental wave of the inverter output.

4. The power conversion apparatus according to claim 2, wherein the first arm fuse melting detector determines the fuse melting, when the first comparator continues for a predetermined first cycle period based on the fundamental wave of the inverter output, and the second arm fuse melting detector determines the fuse melting, when the second comparator continues for a predetermined second cycle period based on the fundamental wave of the inverter output.

5. The power conversion apparatus according to claim 2, wherein, the first arm fuse melting detector determines the fuse melting, when the first comparator continues for a predetermined first cycle period based on the fundamental wave of the inverter output.

6. The power conversion apparatus according to claim 2, wherein, the second arm fuse melting detector determines the fuse melting, when the second comparator continues for a predetermined second cycle period based on the fundamental wave of the inverter output.

7. A power conversion apparatus, comprising:

an inverter that drives an AC motor in variable speed by receiving a power from power supply;

an arm fuse provided in each phase arm of the U-phase arm, V-phase arm and W-phase arm constituting the inverter;

a second arm fuse melting detector detects melting of each arm fuse, the second arm fuse melting detector involves:

- a positive-side U-phase integral value computing circuit, a positive-side V-phase integral value computing circuit, and a positive-side W phase integral value computing circuit integrate the positive direction component of the output current of each phase of the inverter for one cycle of the fundamental wave of the inverter output;
- a negative side U-phase integral value computing circuit, a negative side V-phase integral value computing circuit, and a negative side W phase integral value computing circuit integrate the negative direction component of the output current of each phase of the inverter for one cycle of the fundamental wave of the inverter output;
- first to fourth current unbalance calculators including a circuit outputs a current unbalance from a difference between at least any two of the phase integral values of the positive side U-phase integral value, the positive side V-phase integral value and the positive side W-phase integral value, or any two of the phase integral values of the negative side U-phase integral value, the negative side V-phase integral value and the negative side W-phase integral value, and further including a circuit calculates an absolute value thereof;
- second to fifth comparators compare the outputs of the first to fourth current imbalance calculators with a set second threshold, respectively;
- a second threshold value determining circuit determines the second threshold value by multiplying the current command value of the inverter by a predetermined second coefficient, wherein, the second to fifth comparators operate when the outputs of the first to fourth current imbalance calculators are equal to or higher than the second threshold, respectively, and when anyone of the second to fifth comparators is operated, it is determined that an arm fuse is melted, and operation of the power conversion apparatus is stopped when it is determined that any of the arm fuses is melted.

8. The power conversion apparatus according to claim 7, wherein, the second arm fuse melting detector determines the fuse melting, when the second comparator continues for a predetermined second cycle period based on the fundamental wave of the inverter output.

* * * * *